United States Patent
Carritte et al.

(10) Patent No.: US 11,220,247 B2
(45) Date of Patent: Jan. 11, 2022

(54) METHOD FOR PROTECTING THE AIR SYSTEM IN A COMMERCIAL VEHICLE IN THE EVENT OF TRAILER BREAK-AWAY

(71) Applicant: Bendix Commercial Vehicle Systems LLC, Elyria, OH (US)

(72) Inventors: Timothy Carritte, Elyria, OH (US); Karsten Schnittger, Munich (DE); Max Michalski, Neubiberg (DE)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 8 days.

(21) Appl. No.: 16/451,579

(22) Filed: Jun. 25, 2019

(65) Prior Publication Data

US 2020/0406875 A1 Dec. 31, 2020

(51) Int. Cl.
*B60T 11/10* (2006.01)
*B60T 8/17* (2006.01)
*F16K 15/18* (2006.01)
*B60T 7/20* (2006.01)
*B60T 15/04* (2006.01)

(52) U.S. Cl.
CPC ........... *B60T 11/108* (2013.01); *B60T 7/20* (2013.01); *B60T 8/1708* (2013.01); *F16K 15/18* (2013.01); *B60T 15/041* (2013.01)

(58) Field of Classification Search
CPC .... B60T 11/108; B60T 8/1708; B60T 15/041; B60T 7/20; F16K 15/18
See application file for complete search history.

(56) References Cited

U.S. PATENT DOCUMENTS

| | | | | |
|---|---|---|---|---|
| 3,837,361 A * | 9/1974 | Urban | ............. | B60T 13/36 137/627.5 |
| 5,061,015 A * | 10/1991 | Cramer | ............. | B60T 13/683 303/7 |
| 7,073,873 B2 * | 7/2006 | Kerner | ............. | B60T 13/385 137/12 |
| 7,975,715 B2 * | 7/2011 | Ramler | ............. | B60T 15/203 137/102 |
| 8,282,173 B2 * | 10/2012 | Forster | ............. | B60T 13/263 303/7 |

(Continued)

FOREIGN PATENT DOCUMENTS

EP    2 426 021 A1    3/2012

*Primary Examiner* — Pamela Rodriguez
(74) *Attorney, Agent, or Firm* — Fay Sharpe LLP

(57) ABSTRACT

In the event of a pneumatic trailer connection failure between a tractor and trailer of, e.g., a commercial vehicle, a pressure protection valve (PPV) is provided on the air line between a double check valve that supplies air from one or more service reservoirs and a trailer parking valve without a flow restrictor, which transmits the air to the trailer connection for supplying the trailer brakes. When output pressure on the PPV drops below a predetermined closing pressure threshold due to the connection failure, the PPV closes to protect the tractor brake air supply. Upon restoration of the trailer connection and upon input pressure at the PPV exceeding a predetermined opening pressure threshold, the PPV opens and the trailer brake system is charged more quickly than can be achieved using a conventional trailer parking valve with a flow restrictor.

18 Claims, 8 Drawing Sheets

(56) References Cited

U.S. PATENT DOCUMENTS

| | | | | |
|---|---|---|---|---|
| 8,297,713 B2* | 10/2012 | Soupal | ............... | B60T 8/1708 |
| | | | | 303/7 |
| 8,521,389 B2* | 8/2013 | Ramler | ............... | B60T 13/265 |
| | | | | 701/70 |
| 10,315,636 B2* | 6/2019 | Koelzer | ............... | B60T 11/326 |
| 2018/0251112 A1 | 9/2018 | Griesser et al. | | |

* cited by examiner

METHOD FOR PROTECTING THE AIR SYSTEM IN A COMMERCIAL VEHICLE IN THE EVENT OF TRAILER BREAK-AWAY

BACKGROUND

The present application finds particular application in vehicular air braking systems. However, it will be appreciated that the described techniques may also find application in other pneumatic systems, or other air braking systems.

North American commercial vehicles supply air to towed trailers from a service air system, controlled by a park valve and delivered through a pneumatic line and coupling. If the line fails, or the coupling falls off or if the trailer breaks-away, then the power unit service air is typically protected in the current parking valve using an orifice that relies on pressure drop, thus causing the valve to shuttle. However, this approach limits potential airflow rate to the trailer when recharging trailer air pressure.

The present innovation provides new and improved systems and methods that facilitate providing tractor air brake system protection in the event of a trailer connection failure while improving trailer brake system charge time, which overcome the above-referenced problems and others.

SUMMARY

In accordance with one aspect, a system that facilitates maintaining air pressure in a tractor air brake system upon a trailer connection failure comprises a double check valve (DCV) configured to supply air received from a first service reservoir and a second service reservoir to a trailer parking valve without a flow restrictor. The system further comprises a pressure protection valve (PPV) coupled to the trailer parking valve and configured to have a predetermined closing pressure threshold, such that when an output pressure from the PPV drops below the closing pressure threshold, the PPV closes and maintains a minimum air pressure in the first and second service reservoirs.

In accordance with another aspect, a method of maintaining air pressure in a tractor air brake system upon a trailer connection failure comprises receiving, at a double check valve (DCV), air from a first service reservoir and a second service reservoir, and supplying air from the double check valve, via a pressure protection valve (PPV), to a trailer parking valve without a flow restrictor. The PPV is configured to have a predetermined closing pressure threshold, such that when an output pressure from the PPV drops below the closing pressure threshold, the PPV closes and maintains a minimum air pressure in the first and second service reservoirs.

In accordance with another aspect, an apparatus that facilitates maintaining air pressure in a tractor air brake system upon a trailer connection failure comprises a first valve means configured to supply air received from a first service reservoir and a second service reservoir to a trailer parking valve without a flow restrictor. The apparatus further comprises a second valve means coupled to the trailer parking valve and configured to have a predetermined closing pressure threshold, such that when an input pressure to the second valve means drops below the closing pressure threshold, the second valve means closes and maintains a minimum air pressure in the first and second service reservoirs.

One advantage is that a flow restrictor is not required.

Another advantage is that the system can fill the trailer air brake system much faster when the parking valve is actuated (opened).

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

The described innovation relates to protecting an air system in a commercial vehicle in the event of trailer break away. North American commercial vehicles supply air to towed trailers from a service air system, controlled by a park valve and delivered through a pneumatic line and coupling. If the line fails, or the coupling falls off or if the trailer breaks-away, then the power unit service air is conventionally protected in the parking valve via an orifice that relies on pressure drop, thus causing the valve to shuttle. However, this approach limits potential airflow rate to the trailer. The herein-described systems and methods employ a pressure protection valve (PPV) to protect the service system instead of an orifice in the parking valve. The PPV comprises a piston, o-ring (a valve seat), and spring, and has the characteristics of an opening pressure and a closing pressure. Using the disclosed systems and methods, a fracture of the trailer supply line, loss of coupling head, or break-away of trailer causes a high leakage in the line, dropping the pressure in the PPV delivery. This causes the PPV to close, protecting the power unit service system and eliminating supply air to the park valve. In this manner, air supply to the trailer is not limited by an orifice and can fill much faster. A secondary benefit is that the park valve itself does not have to perform this function, thus allowing more freedom in the design of the parking valve.

Figure 1:
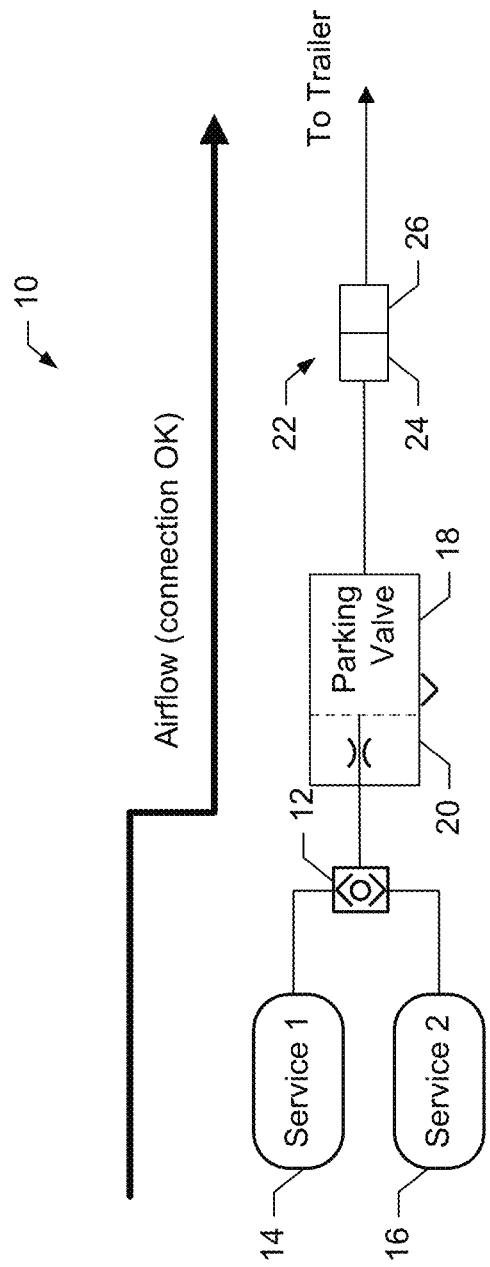
FIG. 1 is an illustration of a system including parking valve with a flow restrictor.

FIG. 1 is an illustration of a system 10 including a double check valve (DCV) 12 supplying air from a first service (supply) reservoir 14 and a second service (supply) reservoir 16 to a trailer parking valve 18, in accordance with various aspects described herein. The general direction of air flow is shown by the thick black line. When air passes from the reservoirs through the double check valve 12, it then enters a flow restrictor (an orifice) 20 before entering the core of the parking valve 18. The flow restrictor 20 may be integrated into the parking valve or may be a separate device. Air is then passed through the parking valve to a trailer connection 22, which is formed of a tractor coupling 24 (e.g., a first glad hand) and a trailer coupling 26 (e.g., a second glad hand) which, when mated, provide a pneumatic connection between the tractor and trailer in order to provide air from the service reservoirs 14, 16 to a trailer air brake system (not shown).

Figure 2:
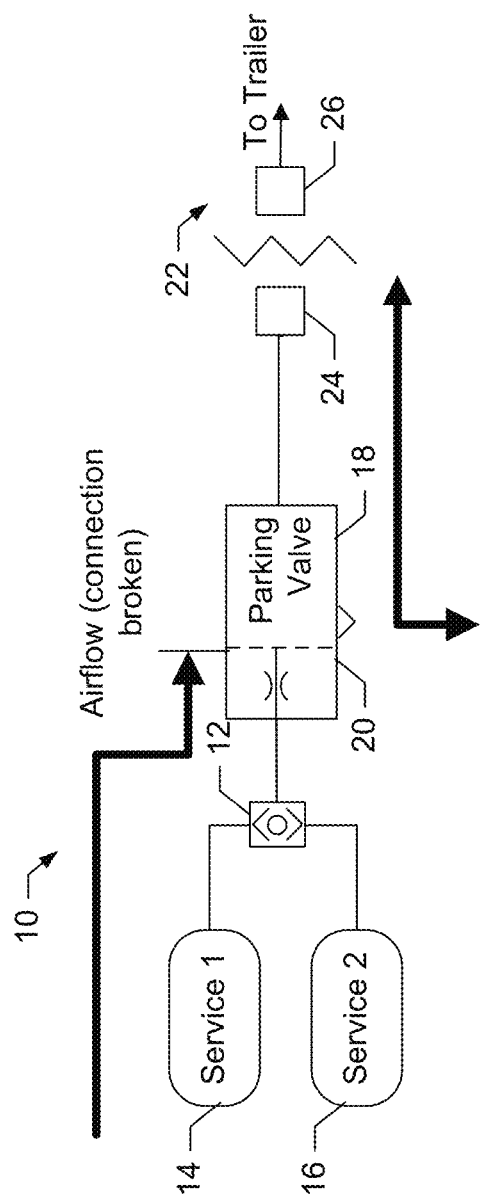
FIG. 2 is an illustration of the system with a failed trailer connection.

FIG. 2 is an illustration of the system 10 with a failed trailer connection 22. As in FIG. 1, the system 10 includes the double check valve (DCV) 12 supplying air from the first service (supply) reservoir 14 and the second service (supply) reservoir 16 to the trailer parking valve 18, in accordance with various aspect described herein. The general direction of air flow is shown by the thick black line. When air passes from the reservoirs through the double check valve 12, it then enters the flow restrictor (an orifice) 20 before entering the core of the parking valve 18. Normally, air would then be passed through the parking valve to the trailer connection 22, which is formed of the tractor coupling 24 (e.g., a first glad hand) and the trailer coupling 26 (e.g., a second glad hand) and on to a trailer air brake system (not shown). However, the trailer connection in Figure to has failed.

In a conventional system, the flow restrictor 20 is needed in order to cause the parking valve "trip" or exhaust the air upon failure of the trailer connection. This happens relatively quickly, thus the pressure loss in service 1 and service 2 mitigated. Air is blocked at the parking valve and is then exhausted to atmosphere through the parking valve and at the broken connection.

However, recharging the air in the brake system upon reconnection of the trailer connection 22 is time consuming due to the flow restrictor 20. Thus, it becomes desirable to remove the flow restrictor 20 in order to expedite system charging. If the flow restrictor 20 is removed, however, the problem becomes how to provide tractor protection when the trailer connection 22 fails without a flow restrictor 20 to exhaust the air.

Figure 3:
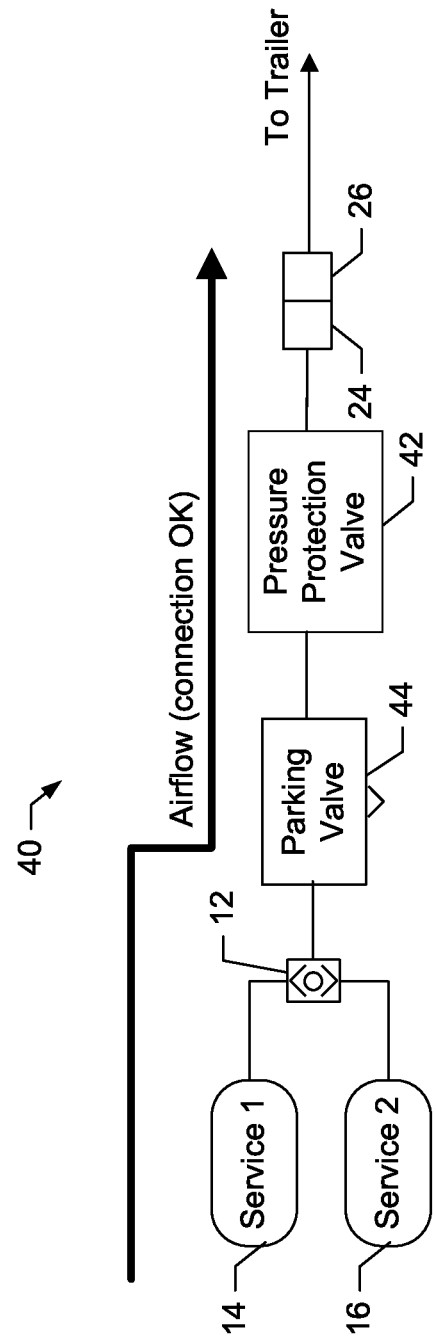
FIG. 3 is an illustration of a tractor pressure protection system that facilitates maintaining air pressure in a tractor air brake system during trailer connection failure, in accordance with one or more features described herein.
Figure 4:
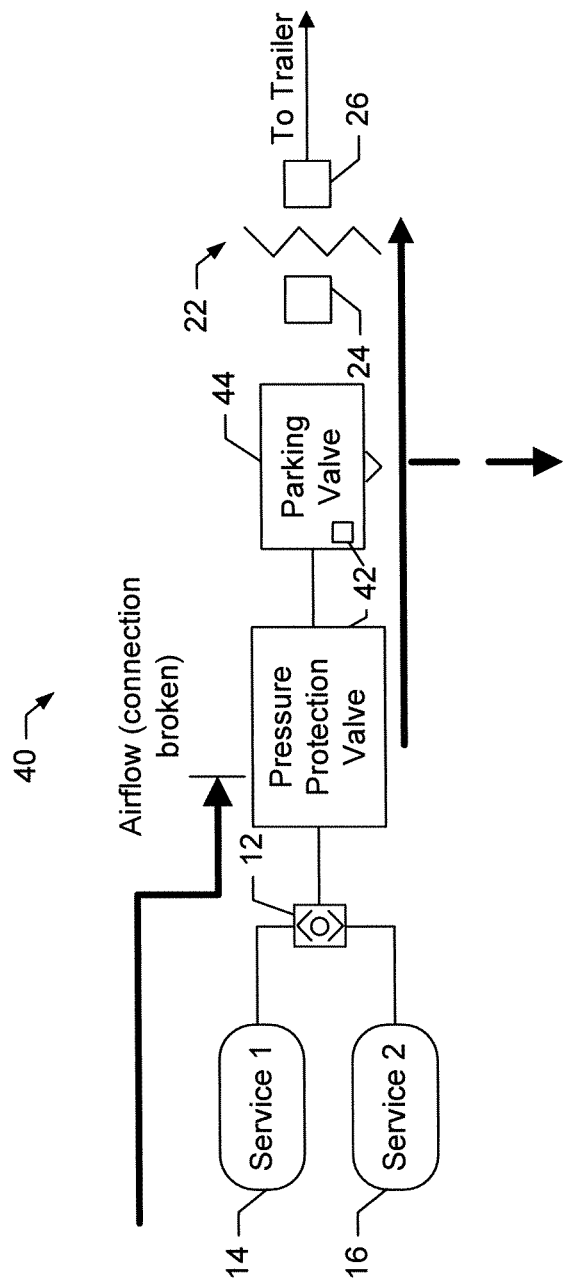
FIG. 4 is an illustration of the system of FIG. 3 with a failed trailer connection.

The solution described herein involves incorporating a pressure protection valve (PPV) between the double check valve 12 and the parking valve 18, as shown in FIGS. 3 and 4, below.

FIG. 3 is an illustration of a tractor air pressure protection system 40 that facilitates maintaining air pressure in a tractor air brake system during trailer connection failure, in accordance with one or more features described herein. The system 40 comprises a double check valve (DCV) 12 supplying air from a first service (supply) reservoir 14 and a second service (supply) reservoir 16 to a trailer parking valve 44. In one embodiment, the double check valve 12 is an MV-3® dash control module such as is manufactured by Bendix Commercial Vehicle Systems LLC of Elyria Ohio. This dash control module is a two-button (typically a red button and a yellow button), push-pull control valve housed in a single body which includes a dual circuit supply valve and a check valve. The MV-3™ valve can duplicate the functions of any existing two or three valve push-pull system and has the advantages of reduced plumbing. The MV-3™ valve body, plungers and spools are made out of a non-metallic, non-corrosive material. All air connections are at the back of the valve with the exception of an optional auxiliary port. The MV-3™ valve provides tractor protection, trailer service air control, a system park function, a trailer park only function, a trailer charge with tractor spring brakes applied function, a supply reservoir selection function, and primary and secondary reservoir connections.

The general direction of air flow is shown by the thick black line. When air passes from the reservoirs through the double check valve 12, it enters a pressure protection valve (PPV) 42 (rather than a flow restrictor 20 as in FIGS. 1 and 2). The air then flows to a parking valve 44 without a flow restrictor and on to the trailer connection 22, which is formed of the tractor coupling 24 (e.g., a first glad hand) and the trailer coupling 26 (e.g., a second glad hand) which, when mated, provide a pneumatic connection between the tractor and trailer in order to provide air from the service reservoirs 14, 16 to a trailer air brake system (not shown).

While the PPV 42 is positioned between the double check valve 12 and the parking valve 44 in FIGS. 3 and 4, it will be appreciated that in another embodiment the PPV may be positioned between the parking valve 44 and the trailer connection 22. That is, the PPV may be installed either upstream or downstream of the parking valve, depending on the embodiment. In another embodiment, the PPV 42 is integral to the parking valve assembly 44.

FIG. 4 is an illustration of the tractor pressure protection system 40 with a failed trailer connection 22. As in FIG. 3, the system 40 includes the double check valve (DCV) 12 supplying air from the first service (supply) reservoir 14 and the second service (supply) reservoir 16 to the trailer parking valve 18, in accordance with various aspect described herein. The general direction of air flow is shown by the thick black line. When air passes from the reservoirs through the double check valve 12, it enters a pressure protection valve (PPV) 42 (rather than a flow restrictor 20 as in FIGS. 1 and 2). Normally, the air would then flow to the parking valve 44 and on to the trailer connection 22, which is formed of the tractor coupling 24 (e.g., a first glad hand) and the trailer coupling 26 (e.g., a second glad hand. However, the trailer connection 22 has failed in the illustrated example.

When the trailer connection 22 fails, pressure begins to decrease in the service reservoirs 14, 16 due to the failed connection. Eventually, the pressure protection valve 42 closes and isolates the remaining pressure in the service reservoirs 14, 16, and the remaining air between the pressure protection valve and connection will exhaust out the failed connection and out the parking valve (once it closes).

Pressure protection valves such as the described PPV 42 use a spring in combination with either a piston or a membrane. When closed, the air supply and delivery are isolated. When opened, supply is connected to delivery. The PPV opens when pressure at the supply (input) increases past a certain point (opening pressure threshold). The PPV closes when pressure at the delivery (output) decreases past a certain point (closing pressure threshold). Therefore, opening is driven by the increase in pressure in service reservoirs 14, 16. Closing is driven by the loss of pressure downstream of the valve, such as when the trailer connection fails. Components of the PPV can be tuned to drive different opening and closing pressure thresholds.

In one embodiment, the PPV 42 can be tuned to any desired psi thresholds. For instance, spring force within the PPV can be selected to dictate an input pressure threshold (e.g., an opening pressure above which the PPV opens), and valve seat diameter dictates a valve closing threshold below which the PPV closes. In one example, at 110 psi, the PPV is open at both the input and output. If pressure drops below 70 psi due to a trailer connection failure, the PPV closes and the input side stays at 70 psi so that the tractor air brake system can operate even though output pressure at the PPV can continue to drop. In another example, opening pressure threshold may be tuned to, e.g., 7 bar, and closing pressure threshold may be set to between 4 and 5 bar, or the like. It will be understood by one of skill in the art that any desired opening and closing pressure thresholds may be employed in conjunction with the herein described PPV, and that he claimed innovation is not limited to the particular examples described herein.

Figure 5:
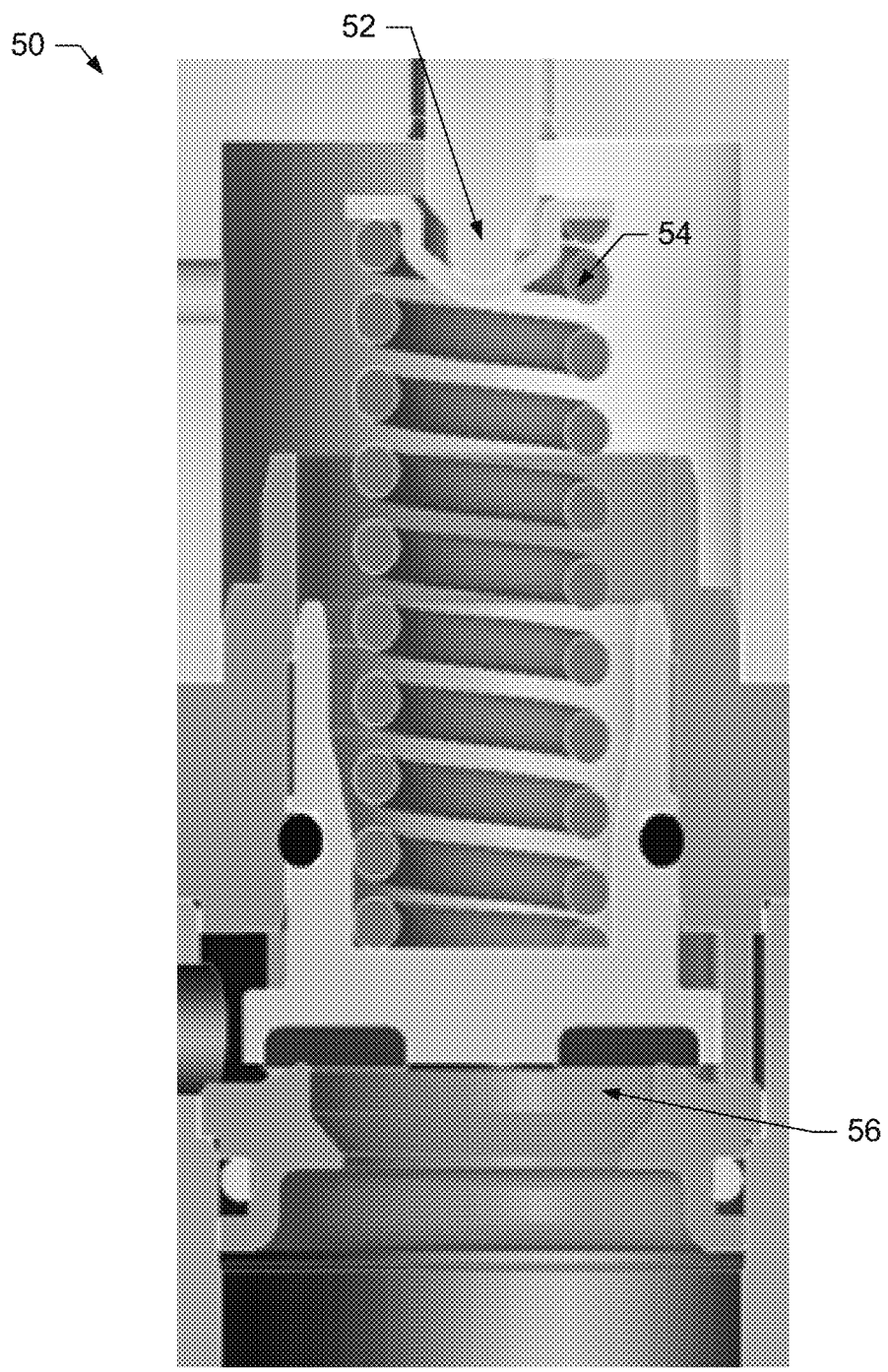
FIG. 5 illustrates a cross section of an electronic air control (EAC) pressure protection valve, such as is employed in the EAC 2.5.

FIG. 5 illustrates a cross section of an electronic air control (EAC) pressure protection valve 50, such as is employed in the EAC 2.5 manufactured by Knorr-Bremse Systeme fur Nutzfahrzeuge GmbH of Munich Germany, which may be employed as the PPV 42 discussed with regard to FIGS. 3 and 4, in accordance with one or more aspects described herein. The EAC 2.5 is an example of a six circuit (6c) piston PPV, wherein each valve 50 comprises a piston 52, a spring 54, and a valve seat 56. The spring can be selected to have a spring force that provides any desired opening pressure threshold, and the valve seat diameter can similarly be selected to provide a desired closing pressure threshold.

One advantage of the EAC 2.5 is that it provides intelligent air management of the vehicle pneumatic system. For instance, the EAC 2.5 can control the filling of the brake and auxiliary circuits, provide fuel savings by intelligent compressor control, and the like. The EAC 2.5 also has an integrated park brake relay valve which results in fewer pneumatic lines and thus a reduced risk of pneumatic line defects and leakage. The EAC 2.5 may also include an integrated electronic or pneumatic parking brake, which reduces required installation space in the cabin and mounting effort, and increases flexibility in the dashboard design.

Figure 6:
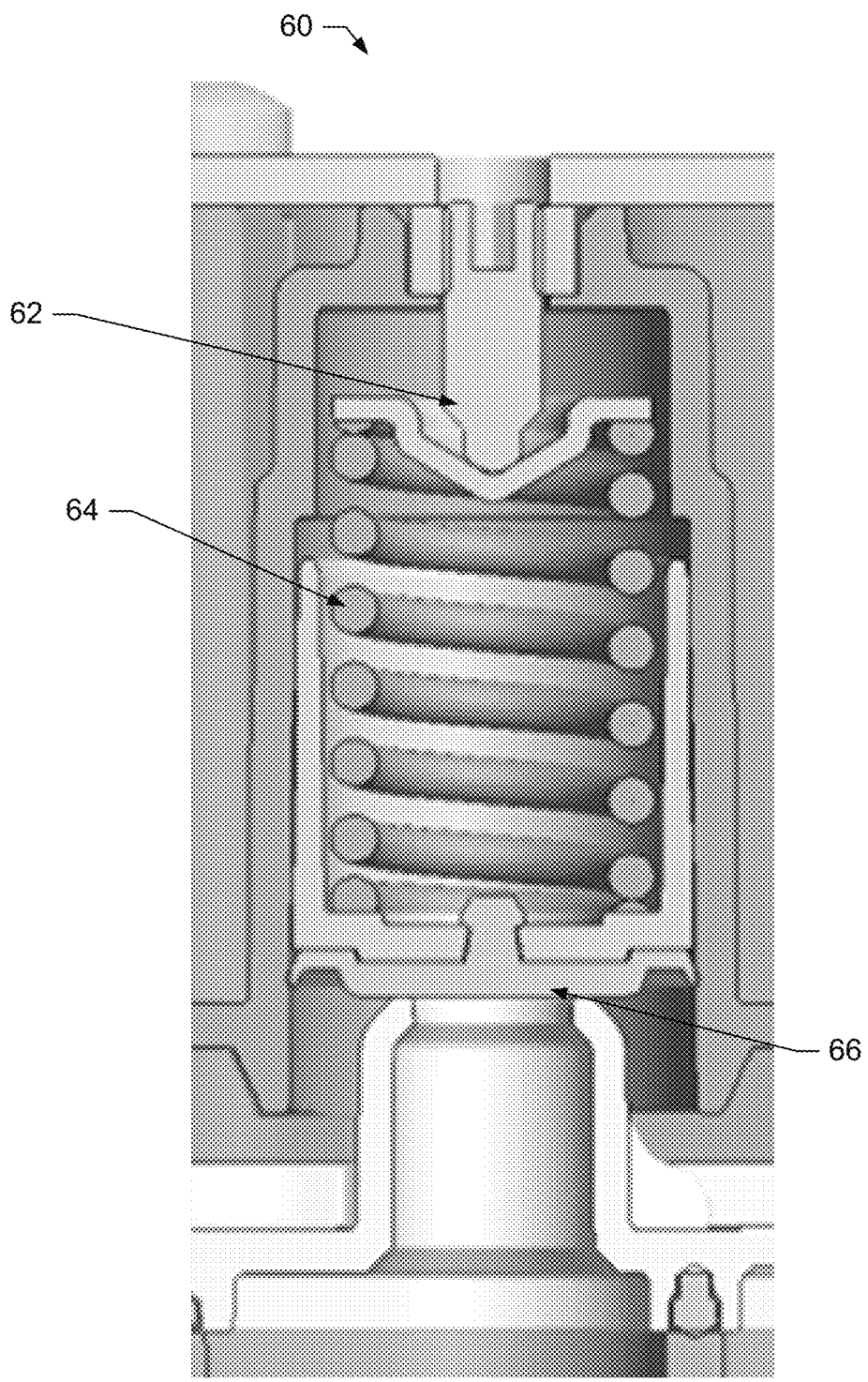
FIG. 6 illustrates a cross section of a piston type pressure protection valve.

FIG. 6 illustrates a cross section of a piston type pressure protection valve 60, which may be employed as the PPV 42 discussed with regard to FIGS. 3 and 4, in accordance with one or more aspects described herein. The piston type PPV is also an example of a 6c piston PPV, and each valve 60 comprises a piston 62, a spring 64, and a valve seat 66. The spring can be selected to have a spring force that provides any desired opening pressure threshold, and the valve seat diameter can similarly be selected to provide a desired closing pressure threshold.

Figure 7:
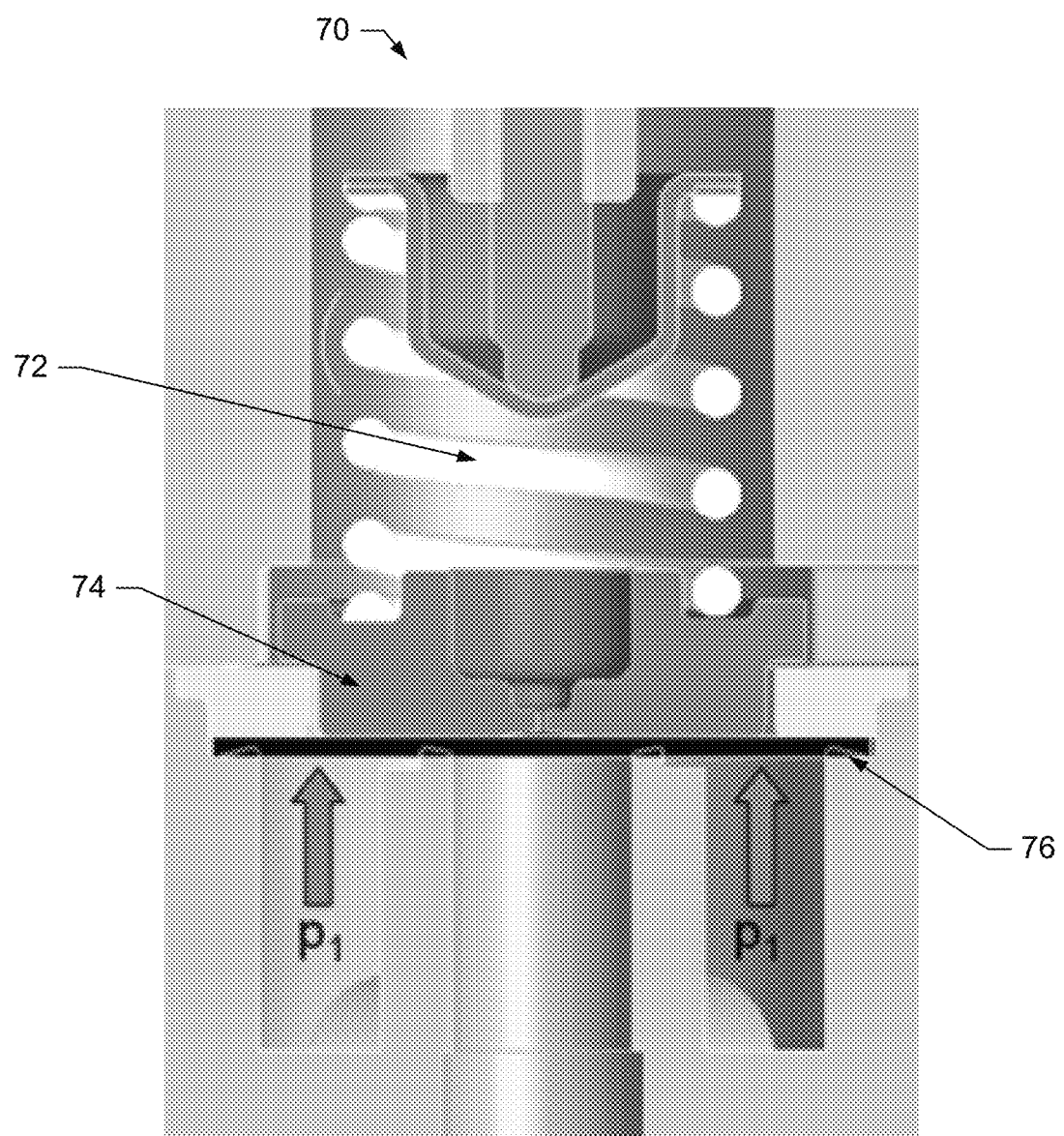
FIG. 7 illustrates a cross section of an membrane style pressure protection valve, such as is employed in the EAC 2.1.

FIG. 7 illustrates a cross section of a membrane style pressure protection valve 70, such as is employed in the EAC 2.1 manufactured by Knorr-Bremse Systeme fur Nutzfahrzeuge GmbH, which may be employed as the PPV 42 discussed with regard to FIGS. 3 and 4, in accordance with one or more aspects described herein. The EAC 2.1 is an example of a 6× membrane PPV, and each valve 70 comprises a piston 72, a spring 74, and a membrane 76. The spring can be selected to have a spring force that provides any desired opening pressure threshold, and the membrane configuration can similarly be selected to provide a desired closing pressure threshold.

It will be appreciated that other types of PPV valves may be employed in conjunction with the herein described systems and/or valve arrangements, including 5× membrane protection valves, 1× piston protection valves, 1× membrane protection valves, 1× triple membrane protection valves, or the like.

Figure 8:
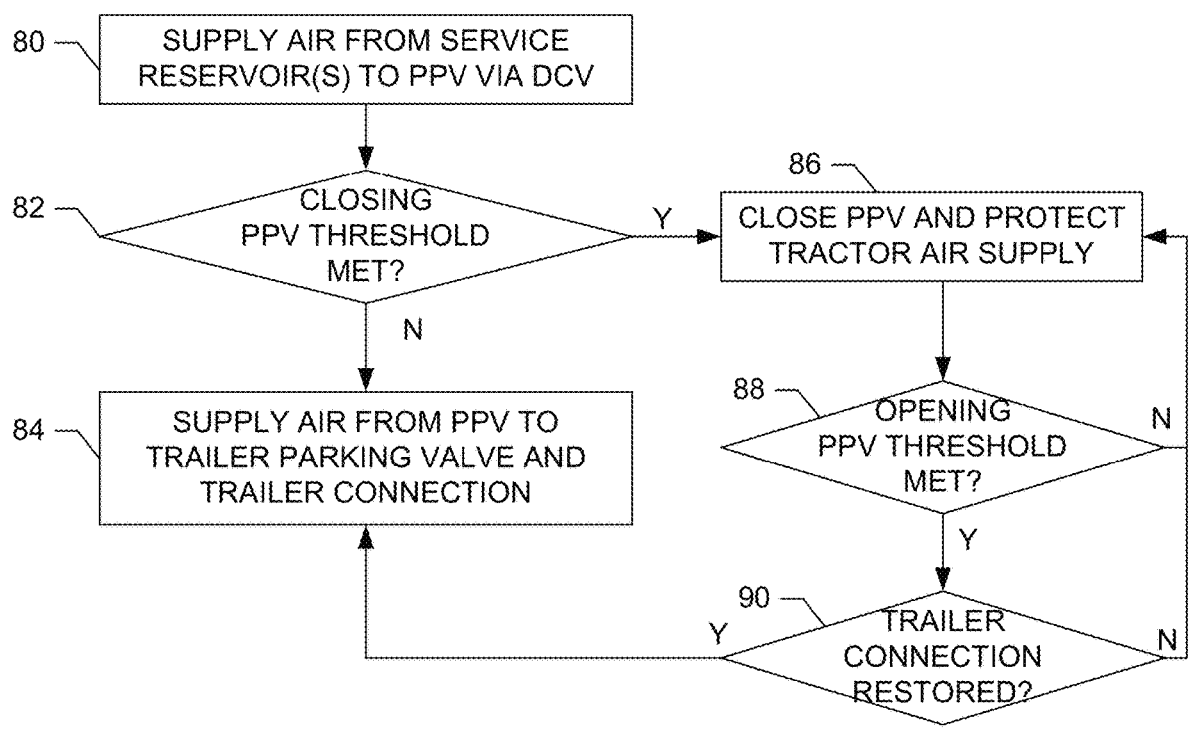
FIG. 8 illustrates a method for protecting a tractor air brake supply in the event of a trailer connection failure, and reducing trailer air brake recharge time using a pressure protection valve (PPV) without a flow restrictor, in accordance with various features described herein.

FIG. 8 illustrates a method for protecting a tractor air brake supply in the event of a trailer connection failure, and reducing trailer air brake recharge time using a pressure protection valve (PPV) without a flow restrictor, in accordance with various features described herein. At 80, air is supplied from one or more service reservoirs to the PPV via a double check valve (DCV) (e.g., an MV-3™ or the like). At 82, a determination is made regarding whether a closing pressure threshold for the PPV has been exceeded. If the closing pressure threshold of the PPV has not been met, then at 84, the PPV remains open and air is passed there through to a trailer parking valve and on to a trailer connection that supplies air form the tractor to a brake system on the trailer.

If the closing pressure threshold of the PPV has been met at 84, then the PPV closes, and the tractor brake air supply is protected, at 86. Air pressure in the service reservoirs is maintained at a pressure equal to the closing pressure threshold of the PPV, which may be tuned to a particular threshold level. At 88, a determination is made regarding whether the opening PPV pressure threshold has been met. If not, then the method reverts to 86 for continued protection of the tractor air supply. If the opening pressure threshold of the PPV has been met at 88, then at 90, a determination is made regarding whether the trailer connection has been restored. If not, then the method reverts to 86 for continued protection of the tractor air supply. If the trailer connection has been restored, then the method proceeds to 84, where air is again supplied to the trailer parking valve and trailer connection for charging a trailer brake system.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A system that facilitates maintaining air pressure in a tractor air brake system upon a trailer connection failure, comprising:
   a double check valve (DCV) configured to supply air received from a first service reservoir and a second service reservoir to a trailer parking valve without a flow restrictor; and
   a pressure protection valve (PPV) coupled to the trailer parking valve and configured to have a predetermined closing pressure threshold, such that when an output pressure from the PPV drops below the closing pressure threshold, the PPV closes and maintains a minimum air pressure in the first and second service reservoirs;
   wherein the pressure protection valve is further configured to have an opening pressure threshold that, when exceeded, and upon restoration of the trailer connection, recharges a trailer air system via the trailer connection.

2. The system according to claim 1, wherein the PPV is positioned upstream from the trailer parking valve, between the DCV and the trailer parking valve.

3. The system according to claim 1, wherein the PPV is positioned downstream from the trailer parking valve, between the trailer connection and the trailer parking valve.

4. The system according to claim 1, wherein the PPV is integral to the trailer parking valve.

5. The system according to claim 1, wherein the closing pressure threshold is approximately 70 psi, and an opening pressure threshold is approximately 110 psi.

6. The system according to claim 1, wherein the pressure protection valve is a 6c piston pressure protection valve.

7. The system according to claim 1, wherein the pressure protection valve is a 6c membrane pressure protection valve.

8. A method of maintaining air pressure in a tractor air brake system upon a trailer connection failure, comprising:
receiving, at a double check valve (DCV), air from a first service reservoir and a second service reservoir;
supplying air from the double check valve, via a pressure protection valve (PPV), to a trailer parking valve without a flow restrictor;
wherein the pressure protection valve is configured to have a predetermined closing pressure threshold, such that when an output pressure from the PPV drops below the closing pressure threshold, the PPV closes and maintains a minimum air pressure in the first and second service reservoirs; and
wherein the pressure protection valve is further configured to have an opening pressure threshold that, when exceeded, and upon restoration of the trailer connection, recharges a trailer air system via the trailer connection.

9. The method according to claim 8, wherein the PPV is positioned upstream from the trailer parking valve, between the DCV and the trailer parking valve.

10. The method according to claim 8, wherein the PPV is integral to the trailer parking valve.

11. The method according to claim 8, wherein the closing pressure threshold is approximately 70 psi, and the opening pressure threshold is approximately 110 psi.

12. The method according to claim 8, wherein the pressure protection valve is a 6c piston pressure protection valve.

13. The method according to claim 8, wherein the pressure protection valve is a 6c membrane pressure protection valve.

14. An apparatus that facilitates maintaining air pressure in a tractor air brake system upon a trailer connection failure, comprising:
a first valve means configured to supply air received from a first service reservoir and a second service reservoir to a trailer parking valve without a flow restrictor; and
a second valve means coupled to the trailer parking valve and configured to have a predetermined closing pressure threshold, such that when an input pressure to the second valve means drops below the closing pressure threshold, the second valve means closes and maintains a minimum air pressure in the first and second service reservoirs;
wherein the second valve means is further configured to have an opening pressure threshold that, when exceeded and upon restoration of the trailer connection, recharges a trailer air system via the trailer connection.

15. The apparatus according to claim 14, wherein the second valve means is positioned upstream from the trailer parking valve, between the first valve means and the trailer parking valve.

16. The apparatus according to claim 14, wherein the second valve means is positioned downstream from the trailer parking valve, between the trailer connection and the trailer parking valve.

17. The apparatus according to claim 14, wherein the second valve means is integral to the trailer parking valve.

18. The apparatus according to claim 15, wherein the second valve means is further configured to have an opening pressure threshold that, when exceeded and upon restoration of the trailer connection, recharges a trailer air system via the trailer connection.

* * * * *